US011227176B2

United States Patent
Wu et al.

(10) Patent No.: US 11,227,176 B2
(45) Date of Patent: Jan. 18, 2022

(54) DEEP-LEARNING-BASED SYSTEM AND PROCESS FOR IMAGE RECOGNITION

(71) Applicant: BANK OF MONTREAL, Toronto (CA)

(72) Inventors: Bo Wu, Toronto (CA); Ching Leong Wan, Toronto (CA); Yuefei Zhu, Toronto (CA); Bo Wan, Toronto (CA); Seyed Hamed Yaghoubi Shahir, Toronto (CA)

(73) Assignee: BANK OF MONTREAL, Toronto (CA)

( * ) Notice: Subject to any disclaimer, the term of this patent is extended or adjusted under 35 U.S.C. 154(b) by 60 days.

(21) Appl. No.: 16/872,938

(22) Filed: May 12, 2020

(65) Prior Publication Data

US 2020/0364485 A1    Nov. 19, 2020

Related U.S. Application Data

(60) Provisional application No. 62/848,721, filed on May 16, 2019.

(51) Int. Cl.
*G06K 9/00* (2006.01)
*G06K 9/32* (2006.01)
*G06N 3/04* (2006.01)

(52) U.S. Cl.
CPC ....... *G06K 9/3283* (2013.01); *G06K 9/00161* (2013.01); *G06K 9/00456* (2013.01); *G06N 3/04* (2013.01)

(58) Field of Classification Search
CPC ............ G06K 9/3283; G06K 9/00161; G06K 9/00456; G06K 9/6256; G06K 9/00449; G06K 9/00852; G06N 3/04; G06N 3/082; G06N 3/0454
See application file for complete search history.

(56) References Cited

U.S. PATENT DOCUMENTS

| 6,662,180 B1 * | 12/2003 | Aref | G06F 16/322 |
| 6,903,723 B1 * | 6/2005 | Forest | A61F 4/00 345/157 |
| 7,711,192 B1 * | 5/2010 | Smirnov | G06K 9/00463 382/182 |

(Continued)

OTHER PUBLICATIONS

CA Examination Report on CA Appl. Ser. No. 3080916 dated Jun. 22, 2021 (7 pages).

*Primary Examiner* — Solomon G Bezuayehu
(74) *Attorney, Agent, or Firm* — Foley & Lardner LLP

(57) ABSTRACT

Disclosed are methods and systems for using artificial intelligence (AI) for image recognition by using predefined coordinates to extract a portion of a received image, the extracted portion comprising a word to be identified having at least a first letter and a second letter; executing an image recognition protocol to identify the first letter; when the server is unable to identify the second letter, the server executes an AI model having a nodal data structure to identify the second letter based upon the identified first letter, the nodal data structure comprising a set of nodes where each node represents a letter, each node connected to at least one other node, wherein connection of a first node to a second node corresponds to a probability that a letter corresponding to the second node is used in a word subsequent to a letter corresponding to the first node.

20 Claims, 17 Drawing Sheets

(56) References Cited

U.S. PATENT DOCUMENTS

| | | | |
|---|---|---|---|
| 10,878,270 B1* | 12/2020 | Cao | G06K 9/325 |
| 2006/0123051 A1* | 6/2006 | Hofman | G06K 9/6857 |
| 2010/0031330 A1* | 2/2010 | Von Ahn | G06F 21/36 |
| | | | 726/5 |
| 2014/0161365 A1* | 6/2014 | Acharya | G06K 9/3283 |
| | | | 382/229 |
| 2014/0193075 A1* | 7/2014 | Pavani | G06K 9/18 |
| | | | 382/182 |
| 2015/0269431 A1* | 9/2015 | Haji | G06K 9/00879 |
| | | | 382/186 |
| 2017/0372156 A1* | 12/2017 | Kalenkov | G06F 40/106 |

* cited by examiner

DEEP-LEARNING-BASED SYSTEM AND PROCESS FOR IMAGE RECOGNITION

CROSS REFERENCE TO RELATED APPLICATIONS

This application claims priority to U.S. Provisional Application No. 62/848,721, filed May 16, 2019, which is incorporated by reference in its entirety.

TECHNICAL FIELD

The present disclosure generally relates to the field of image processing using artificial intelligence/machine learning techniques.

BACKGROUND

Conventional software solutions utilize image processing techniques in conjunction with artificial intelligence (AI) and machine learning (ML) techniques to identify various attributes within an image. In an example, image recognition software may be used to identify hand written content, e.g., handwritten name or account number of a customer and/or his signature on a check.

While these conventional software solutions are helpful, they face technical challenges that have caused inaccurate results and inefficiencies. For instance, to train the AWL models, conventional software solutions utilize training datasets that include "ground truth" data that represents data known to be true and accurate. For instance, a server may train the AI/ML models using images of previously submitted checks with handwritten names and/or signatures. When the AI/ML models are trained using ground truths datasets, the AI/ML models can intake an image and predict the handwritten content. However, generating a training dataset that includes unique ground truths has been challenging. Because some names are not as ubiquitously used as others are, a server training the AI/ML models may not be able to provide enough ground truths of those names to properly train the AI/ML models. As a result, these models may not be properly trained and may not identify these unique names.

In a non-limiting example, an AI/ML model can be trained to identify a customer's name handwritten on a check. To train the AI/ML model, a server may use previously received checks with different handwritten names. Because some names are ubiquitously used, the training dataset may include more examples of those names. In contrast, the training dataset may not include as many non-popular names. For instance, the training dataset may include far more ground truth images of handwritten samples of "John" than "Jaspal." Therefore, the AI/ML model may be properly trained to identify and predict the handwritten images corresponding to "John" than "Jaspal." As a result, conventional software solutions do not produce accurate results when executed to identify unique and non-ubiquitous content.

SUMMARY

For the aforementioned reasons, there is a desire for a software solution that uses image recognition and/or AI/ML techniques to predict content of an image when ground truth samples of the content are not present within the training dataset. For instance, there is a need for a software solution to extract image attributes and predict a handwritten name when ground truth data (e.g., previously submitted images) for that particular name is not ubiquitously available.

In an embodiment, a method comprises extracting, by a server, a first image portion from a first image, the first image portion comprising a word to be identified, the server using an optical character recognition protocol and predefined coordinates of the first image to extract the first image portion, the word comprising at least a first letter and a second letter; executing, by the server, an image recognition protocol to identify the first letter; when the server is unable to identify the second letter using the image recognition protocol, executing, by the server, a neural network comprising a nodal data structure to identify the second letter based upon the identified first letter, the nodal data structure comprising a set of nodes where each node represents a letter, each node within the set of nodes connected to at least one other node within the set of nodes, wherein connection of a first node to a second node corresponds to a probability that a letter corresponding to the second node is used in the word subsequent to a letter corresponding to the first node.

In another embodiment, a system comprises a computing device configured to transmit a first image to a server along with a request for the server to identify content of a first image portion within the first image; and the server in communication with the computing device, the server configured to extract the first image portion from the first image, the first image portion comprising a word to be identified, the server using an optical character recognition protocol and predefined coordinates of the first image to extract the first image portion, the word comprising at least a first letter and a second letter; execute an image recognition protocol to identify the first letter; when the server is unable to identify the second letter using the image recognition protocol, execute a neural network comprising a nodal data structure to identify the second letter based upon the identified first letter, the nodal data structure comprising a set of nodes where each node represents a letter, each node within the set of nodes connected to at least one other node within the set of nodes, wherein connection of a first node to a second node corresponds to a probability that a letter corresponding to the second node is used in the word subsequent to a letter corresponding to the first node.

In various further aspects, the disclosure provides corresponding systems and devices, and logic structures such as machine-executable coded instruction sets for implementing such systems, devices, and methods. In this respect, before explaining at least one embodiment in detail, it is to be understood that the embodiments are not limited in application to the details of construction and to the arrangements of the components set forth in the following description or illustrated in the drawings. In addition, it is to be understood that the phraseology and terminology employed herein are for the purpose of description and should not be regarded as limiting.

Many further features and combinations thereof concerning embodiments described herein will appear to those skilled in the art following a reading of the present disclosure.

DETAILED DESCRIPTION

Embodiments of methods, systems, and apparatus are described through reference to the drawings. Embodiments described herein relate to machine learning, and in particular, deep learning processes to automatically extract data from image, such as an image of a check.

Figure 1:
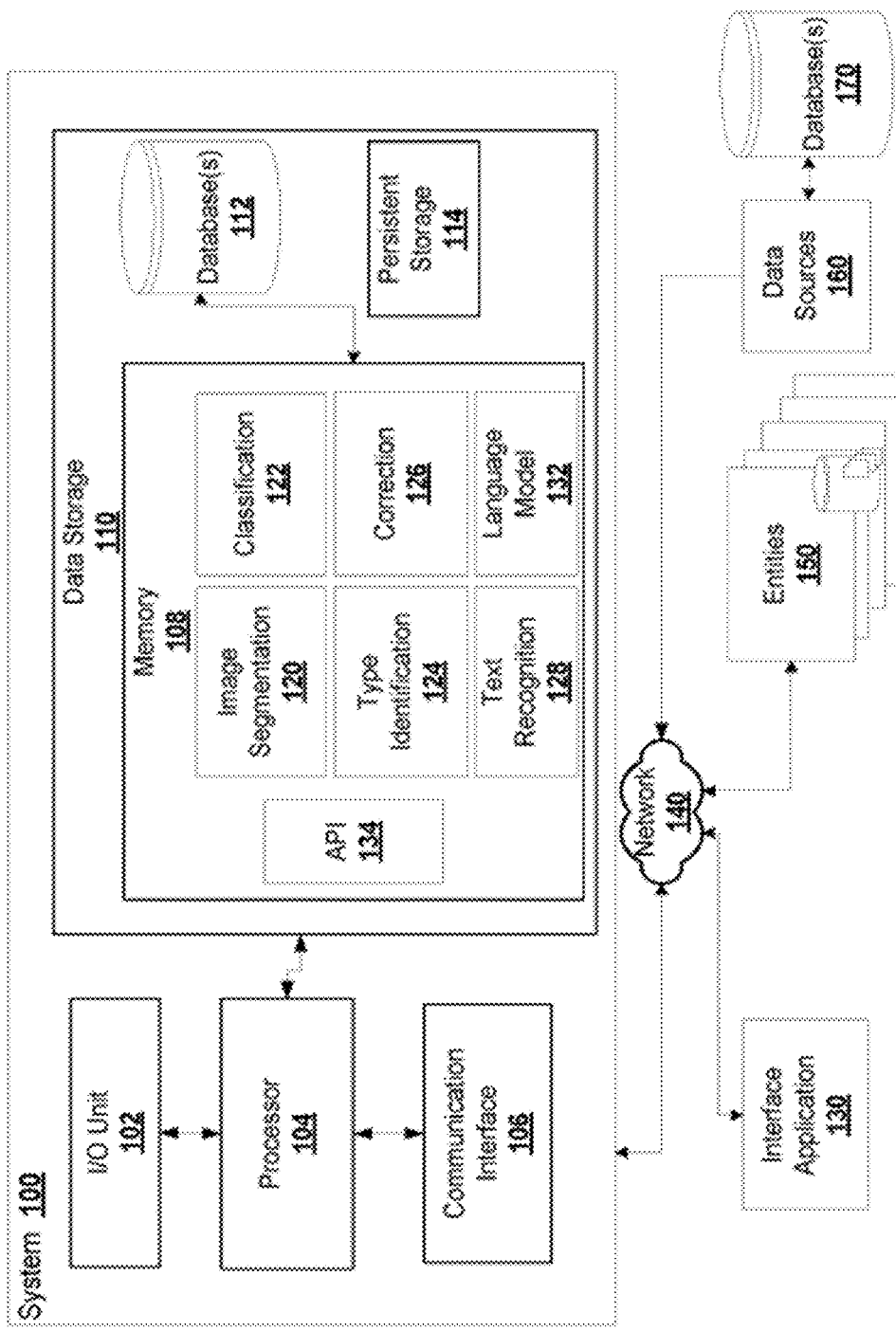
FIG. 1 is a diagram of a system for image data extraction, according to an embodiment.

FIG. 1 is a diagram of a system 100 for image data extraction and identification, in accordance with some embodiments. The system 100 can include an I/O Unit 102, a processor 104, communication interface 106, and data storage 110. The processor 104 can execute instructions in memory 108 to implement aspects of processes described herein. The processor 104 can execute instructions in memory 108 to configure image segmentation 120, classification 122, type identification 124, correction 126, text recognition 128, language model 132, application-programming interface (API) 134, and other functions described herein. The system 100 may be software (e.g., code segments compiled into machine code), hardware, embedded firmware, or a combination of software and hardware, according to various embodiments.

The system 100 can implement automatic extraction of data (including payee name, amount, memo, and seal/stamp) from images of customer checks along with an API 134, which can be integrated into end-to-end business process (BP) tools such as robotic process automation (RPA) tools.

The image segmentation 120 processes a check image to generate extracted text box images (e.g., segments of the check image). In some embodiments, the image segmentation 120 uses a connectionist text proposal network (CTPN) (e.g., Textboxes++) to process the image (e.g., front side and/or backside check images).

The text box classification 122 classifies the text box images into different categories. An example category is handwritten text box category. Other example categories are printed category, signature category, and stamp/seal category. In some embodiments, the text box classification 122 use as convolutional neural network model to classify the text box images into the different categories.

The type identification 124 identifies a type for each of the text box images classified as the handwritten text box category and/or stamp/seal text box category. In some embodiments, the type identification 124 identifies the type of text box image based on its location and surrounding box images. In some embodiments, the type identification uses a multi-class gradient boosting model to identify the type.

The correction 126 tool corrects the text box images or a subset of text box images (e.g., classified as the handwritten text box category and/or stamp/seal text box category). In some embodiments, the correction 126 tool performs one or more corrections including but not limited to background removal, line removal, rotational adjustment, de-slanting, and de-noising.

The text recognition 128 uses the language model 132 to generate extracted data from the corrected text box images or a subset of the corrected text box images (e.g., classified as the handwritten text box category and/or stamp/seal text box category). In some embodiments, the text recognition generates the extracted data using a convolutional recurrent neural network (CRNN).

The API 134 enables end-to-end BP and RPA tools to incorporate functions of the system 100. The system 100 can receive images of checks from interface application 130 (e.g., residing on a device with a camera and/or memory), entities 150, and/or data sources 160 (coupled to databases 170). The system 100 can transmit output data (e.g., extracted data) to interface application 130 (e.g., residing on a device with a display), entities 150, and/or data sources 160 (coupled to databases 170). For example, the interface application 130 can display output data (e.g., extracted data) for verification regarding accuracy. The feedback or verification can be used to train system 100, for example.

The I/O unit 102 can enable the system 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the system 100 to communicate with other components, to exchange data with other components, to access and connect to network resources, to serve applications, and perform other computing applications by connecting to a network 140 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., WMAX), SS7 signaling network, fixed line, local area network, wide area network, and others, including any combination of these.

The system 100 can be operable to register and authenticate users (using a login, unique identifier, and password for example) prior to providing access to applications, a local network, network resources, other networks, and network security devices. The system 100 can connect to different machines, entities 150, and/or data sources 160 (linked to databases 170).

The data storage 110 may be configured to store information associated with or created by the system 100, such as for example image data, extracted data fields, data models, neural networks, and the like. The data storage 110 may be a distributed storage system, for example. The data storage 110 can implement databases, for example. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and the like.

Figure 2:
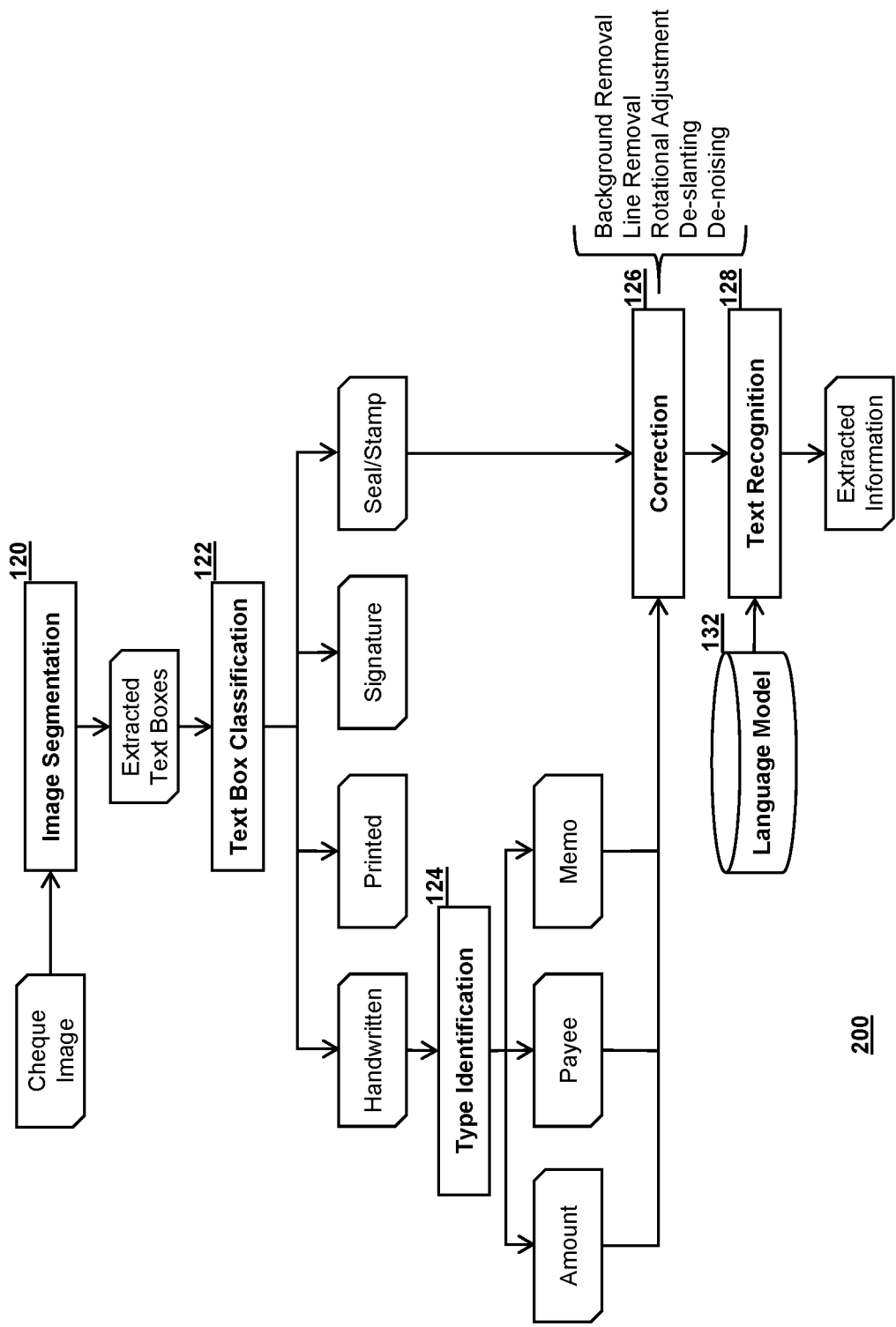
FIG. 2 is a flowchart diagram of a process for data extraction and recognition indicating different computational steps, according to an embodiment.

FIG. 2 is a flowchart diagram of a process 200 for data extraction indicating different computational steps. As shown, the process 200 involves different computing functions configured and performed by a system server (e.g., a server or computer having a processor, such as the processor 104 and coded instructions stored in memory of system 100).

The image segmentation 120 receives check images (front side and backside images). The image segmentation 120 partitions the input check image into multiple (possibly over-lapping) segments. Each segment can represent a text block on the check (or another relevant block). The image segmentation 120 generates the bounding boxes around the text blocks of the check image.

In some embodiments, the image segmentation 120 configures/implements a CTPN and a Textboxes++ network. This involves developing, training and tuning the networks based on real check images to achieve the parameters and weights. The networks are customized based on real check images to achieve acceptable performance. Moreover, the image segmentation 120 processes the front side and backside check images.

The image segmentation 120 uses CTPN to detect arbitrarily long text boxes. However, this network might not be able to handle slanted text lines with big slopes. CTPN can be suitable for the front side of the check image since the text blocks are relatively straight with arbitrary length.

The image segmentation 120 uses Textboxes++ to detect text boxes with big slopes (e.g., satisfying a threshold), but it might not be able to handle arbitrary long text lines. Textboxes++ is suitable for the backside check images since the seals/stamps and handwritten texts on the backside are usually short with significant slopes.

Both models (CTPN and Textboxes++) use deep neural network (DNN) architectures, which can be trained on a proper domain-specific dataset to be accurate and effective. The system server trains the CTPN and Textboxes++ models on check images. In particular, the system server customizes, trains, and tunes these models on real check images to achieve the weights and parameters of the neural networks. The image segmentation 120 processes the check image to generate extracted text boxes.

This text box classification 122 classifies the extracted text segments into different categories. For example, in some embodiments, the text box classification 122 classifies the extracted text segments into four categories: handwritten blocks, printed blocks, signatures, and stamps/seals. The printed text blocks can be processed by OCR software, for example. The handwritten and stamp blocks undergo further processing by the system server.

This text box classification 122 can use a convolutional neural network (CNN) model to classify the image segments into the different categories. The system server develops, trains, and tunes the CNN model on real check image segments to achieve the weights and parameters of the neural networks.

The type identification 124 processes the handwritten blocks categorized by text box classification 122. The type identification 124 identifies the type of handwritten box based on its location and surrounding boxes. Example types include amount, payee, memo, and the like. The outcome of this step can be inaccurate per se, but significantly improves the result when combined with the outcome of other steps.

The type identification 124 uses a multi-class gradient boosting model to identify the type of handwritten text boxes. The system server develops, trains, and tunes the gradient boosting model based on real check images.

Before applying the text recognition 128, the segmented text blocks are processed by the correction 126 tool. These corrections include but are not limited to background removal, line removal, rotational adjustment, de-slanting, de-noising, and the like. The correction 126 tool uses customized modules for check images. The text recognition 128 processes the corrected segments to extract data using language model 132.

Word-level and character-level language models (LM) can be based on English dictionary. However, the texts on checks (particularly payee information and memo) may not generally follow English words. The language model 132 used by the system server framework for payee name can be based on first/last names, and the language model 132 for the amount is based on numbers in words.

In some embodiments, the text recognition 128 configures/implements a Convolutional Recurrent Neural Network (CRNN). The language models 132 are specialized for different categories of text boxes and incorporated within the CRNN model for text recognition 128. Some text recognition models using language models are pre-trained on generic word-level and character-level English dictionary. However, the texts on checks (particularly payee information and memo) may not follow English words and accordingly specialized language models 132 are used.

In some embodiments, the text recognition 128 uses the CRNN with the Language Model 132 to recognize the text from segmented and corrected images. The CRNN model has a DNN architecture, which is configured and trained on a proper domain-specific dataset to be accurate and effective. The system server configures/implements, trains, and tunes this model on real check images to achieve the weights and parameters of the neural network and other computational components.

As noted, image segmentation can use a CTPN model to segment printed, handwritten, and signature text out the front of check images to generate extracted text box images.

The system server customizes the CTPN model for check images. A CTPN model can use VGG16 to generate a feature map, which may be computationally heavy and may be unnecessary for check images. Additionally or alternatively, the system server may use a stable small ResNet structure instead of VGG16, in some embodiments.

Figure 3A:
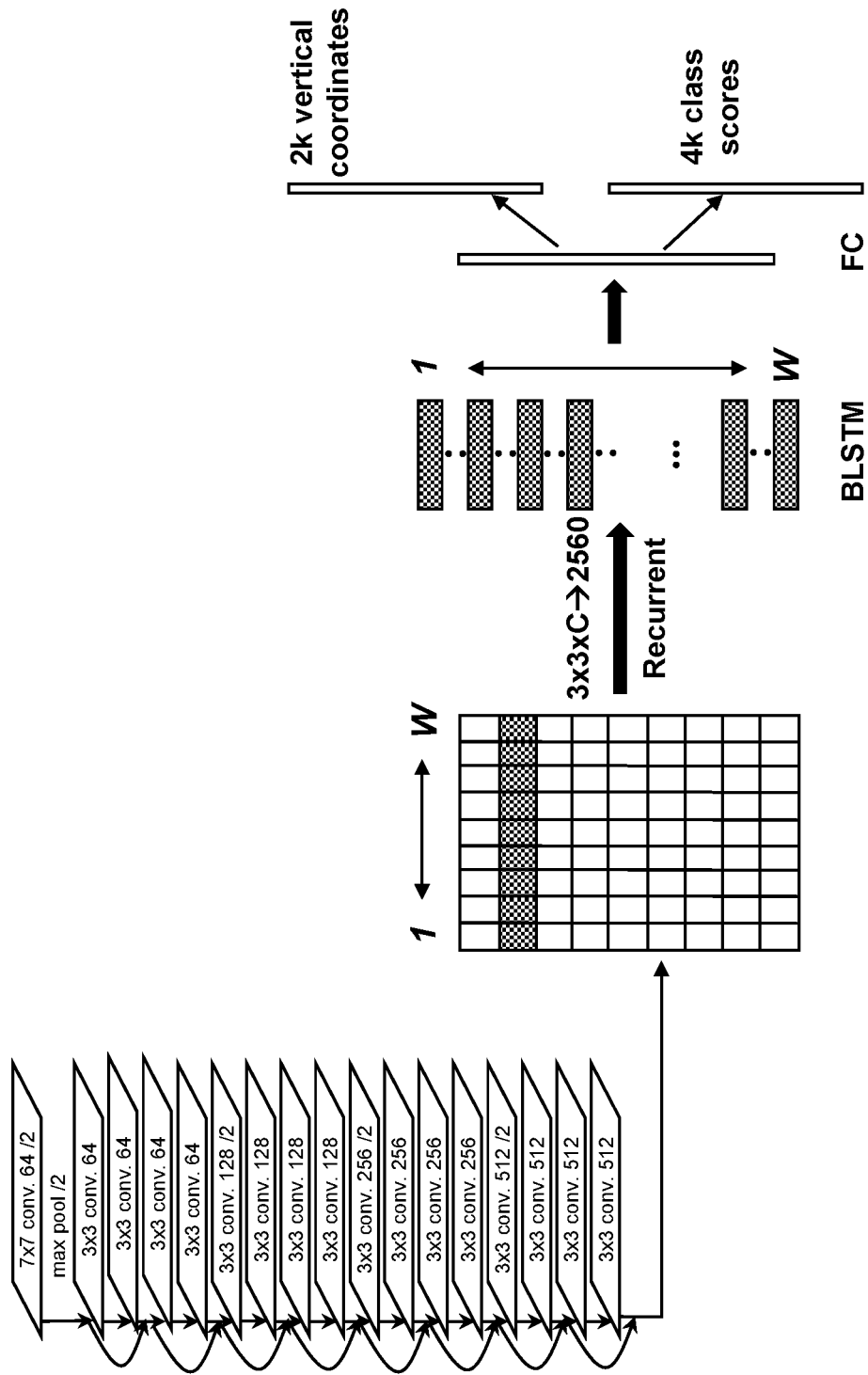
FIG. 3A shows a network structure of the connectionist text proposal network (CTPN) model, according to an embodiment.

FIG. 3A shows an example network structure for some embodiments of the CTPN model. A CTPN model can use ten (or any other predefined number of) different heights varying from 11 to 273 pixels. The processes and methods described in FIG. 3A may involve different computing functions configured and performed by a system server (e.g., a server or computer having a processor, such as the processor 104 and coded instructions stored in the memory of system 100).

The system server can adopt eight different heights from 16 to 194 pixels, since text on check images might be limited in height and size. The system server can reduce the horizontal gap between text boxes to 25 pixels to better fit check image data. The system server can train a model on a dataset of images with text, getting weights and parameters. The system server can use this pre-trained model to continue training on real check images to tune the weights to better fit check images.

In some embodiments, the system server can use TextBoxes++ model to segment text out the back of check images to generate extracted text box images. The system server customizes and configures the TextBoxes++ model for check images.

A TextBoxes++ model can use 13 layers of VGG16 as a backbone followed by 10 extra convolutional layers and six text-box layers. This architecture is computationally heavy and might be unnecessary for check images. Instead, the system server can use another architecture that can be referred to as Densely Connected Convolutional Networks (DenseNets). The DenseNets can use direct connections from a layer to its subsequent layers.

In some embodiments, there might not be enough check images for model training, and in the first step, the system server can pre-train the model on datasets of text images to get the weights and parameters of the network. In the next step, the system server can apply transfer learning by using this pre-trained model and continue training and fine-tuning the weights on real check images to fit them better.

The DenseNets implementation can be followed by text box layers. However, the system server may be required to identify long vertical writing on the checks as opposed to random street scene texts. The system server can therefore adjust the aspect ratios of textboxes to cover horizontal boxes in a better way. After segmentation and information detection, the system server collects a subset of text boxes for further processing.

Figure 3B:
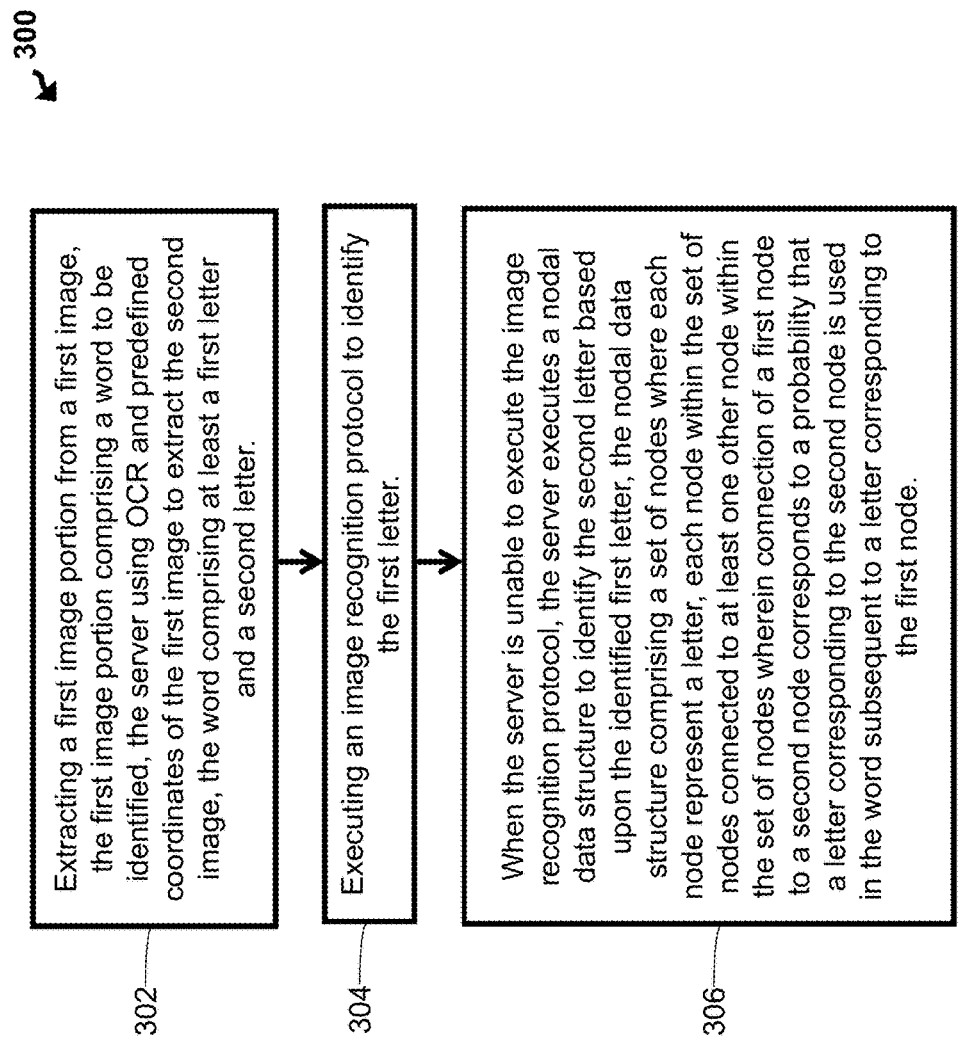
FIG. 3B shows a flow diagram of a process executed to identify content of an image, according to an embodiment.

FIG. 3B illustrates a flow diagram of a process executed to identify content of an image, according to an embodiment. The method 300 includes steps 302-304. However, other embodiments may include additional or alternative execution steps, or may omit one or more steps altogether. In addition, the method 300 is described as being executed by a system server, similar to the system server described in FIG. 1. However, in some embodiments, steps may be executed by any number of computing devices operating in the distributed computing system described in FIG. 1.

Even though aspects of the methods and systems described herein are described in the context of identifying handwritten letters from a check, it is expressly understood that the methods and systems described herein apply to identifying content of any image. For instance, the methods and systems described herein can be applied to handwritten and/or typed words that include character, letters, numbers, or any other content in any language.

At step 302, the system server may extract, a first image portion of the first image comprising a word to be identified, the server using predefined coordinates of the first image to extract the first image portion, the word comprising at least a first letter and a second letter.

The system server may receive a request to identify content of an image. For instance, a computing device may transmit an image to the system server along with a request to identify the written contents. The contents may include letters, numbers, and characters. For brevity and clarity, the embodiments described herein describe how the system server identifies a name hand written on a check. However, the method 300 applies to any writing that includes any content, such as letters, numbers, and other characters in any language.

Figure 4:
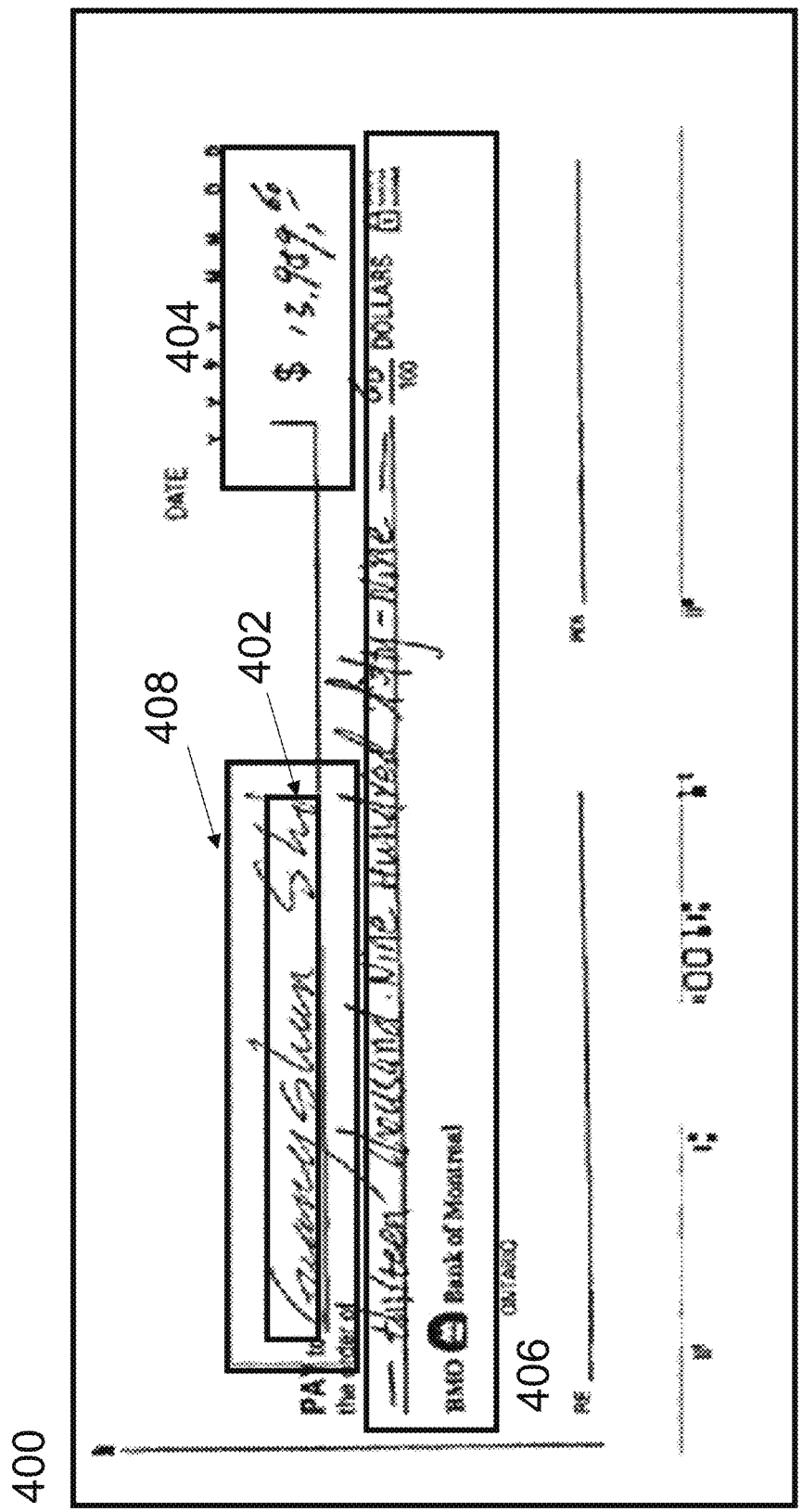
FIG. 4 shows an illustration for processing a text box, according to an embodiment.

Referring now to FIG. 4 an example of a received image is illustrated, in accordance with an embodiment. In this embodiment, the system server receives an image of check 400 and extracts the handwritten portion using predefined areas within the check (e.g., outer box 408 and inner box 402). The "payee" box is used as an example. The methods, processes, and systems illustrated in FIG. 4 may involve different computing functions configured and performed by a system server (e.g., a server or computer having a processor, such as the processor 104 and coded instructions stored in memory of the system 100). As depicted, the system server receives image 400 of a check along with a request to identify the hand-written content on the check 400. As depicted, the check 400 may include a numerical amount 404, a payee's name (depicted in the inner box 402), and a written amount 406. Also as depicted, one or more of the text/handwritten content may not perfectly aligned with others. For instance, the inner box 402 may not horizontally align with other handwritten or printed components of the check 400.

As will be described throughout this disclosure, the system server may be requested to identify the handwritten name within the inner box 402. The system server may utilize various modules and models (e.g., the segmentation model) to recognize the handwritten pays name within the inner box 402. As shown, the handwritten content may not completely fit within inner box 402. For instance, some strokes of the writing may outside the inner box 402. The system server implements an extension process to extend the inner box 402 to include all strokes, which belongs to the payee name, meanwhile filtering out noise strokes. For illustrative purposes, the extended box is shown as the outer box 408.

In some configurations, the system server may use predetermined attributes to identify the inner box 402. For instance, the system server may use predefined coordinates of the check 400 to identify the inner box 402. However, in the embodiments where the handwritten content is also located outside the inner box 402, the system server may extend the inner box 402 to the outer box 408. For the extension process, the system can set 30 pixels as the margin to extend the original (inner) box 402, thereby creating the outer box 408. The system server might only consider all strokes in the outer box 408. The system server segments the outer box 408 out of the check image, converts it to grey scale and inverts each pixel. This may be implemented by correction 126, as described in FIG. 1.

Referring back to FIG. 3, at step 304, the system server may execute an image recognition protocol to identify the first letter. The system server may execute several image recognition protocols to generate a preliminary identification of the image received in step 302.

Figure 5:
FIG. 5 shows a segmented image that has been converted by a system for check data extraction, according to an embodiment.
Figure 6:
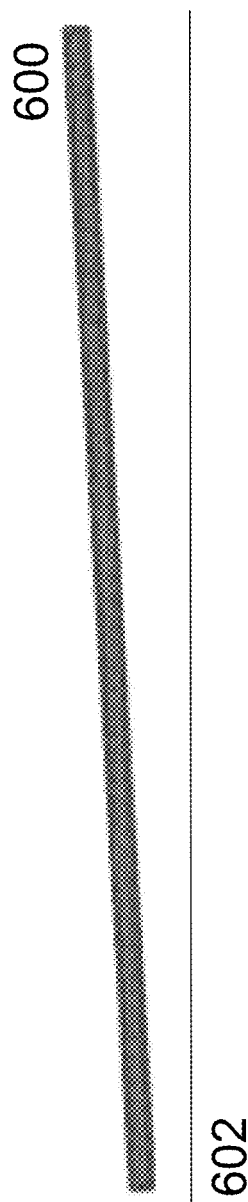
FIG. 6 shows a horizontal line in an image segment, according to an embodiment.
Figure 7:
FIG. 7 shows the image segment that results after the system for check data extraction removes the line, according to an embodiment.

Referring now to FIGS. 5-7, and method of extracting an image to be identified from a check and removing "noise" is illustrated. As depicted in FIGS. 5-7, the system server may extract a relevant portion of the received image. The relevant portion may refer to the handwritten content for which the system server has received a request to identify. For instance, as depicted in FIG. 5, the system server extracts segment 500 from the check 400. The segment 500 may include content other than the handwritten content (sometimes referred to herein as "noise"). For instance, the segment 500 may include the line 502. As depicted in FIG. 6, the system server identify the line 600 and remove from the segment 500, resulting in the segment 700.

FIG. 5 shows an example segmented image that has been converted by a system server, such as the system 100 described in FIG. 1. The system server (e.g., correction 126 tool) can correct an image segment by implementing different artifact removal processes to remove artifacts from the segments of the image. For example, a check's handwritten parts can have a horizontal line. The system server can remove the line to increase the recognition accuracy.

The line 502 may not be perfectly horizontal; it may have a small slope. Therefore, in some embodiments, conventional image recognition methods of finding horizontal lines might not be suitable. To solve this problem, the system server sets a ratio of the segment length (for example ¼) as the length of horizontal line detector, which in this example is 159 pixels. Moreover, from the box image, the system server may find all lines that can fit into the threshold number of pixels (e.g., 159 horizontal pixels). If a stroke can fit multiple horizontal line detectors, the system server considers it as a long horizontal line.

FIG. 6 shows an example horizontal line 602 and a sloped line 600. The line 600 has a slope and can fit several short horizontal lines. The system server can consider it a long horizontal line. After the system server identifies the line 602, the system server can remove it from the image segment 500. For example, the system server can use Gaussian Blur method to fill the pixel that it removes (e.g., pixels that are identified as lines).

FIG. 7 shows the image segment 700 that results after the system server removes the line 600. The system server (e.g., correction 126 tool) can correct an image segment by implementing different de-noising processes. As described herein, the system server extends the text box from inner box area to the outer box area. This process can introduce many strokes that do not belong to the payee name (or other example text box). In this step, the system server can remove the extra strokes using a variety of image/pixel removing techniques.

Figure 8:
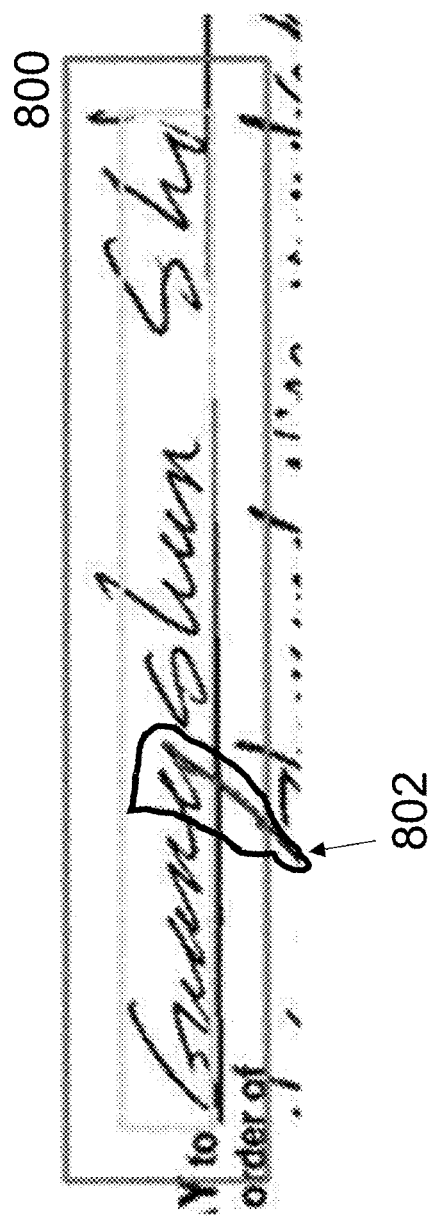
FIG. 8 illustrates a text box with extra strokes to be removed by the system for check data extraction, according to an embodiment.

FIG. 8 illustrates an example text box 800 with extra strokes to be removed by system server. A stroke can be considered as a group of connected pixels in a segment. For example, the encircled stroke 802 is a group of connected pixels. The system server detects all these strokes in the segmented image 800. If a stroke is fully in the inner box or a part of stroke is in the inner box, the system server can acknowledge/identify this stroke as belonging to the payee name, otherwise it is considered noise. In this way, system server can remove noise introduced by the extension technique.

Figure 9:
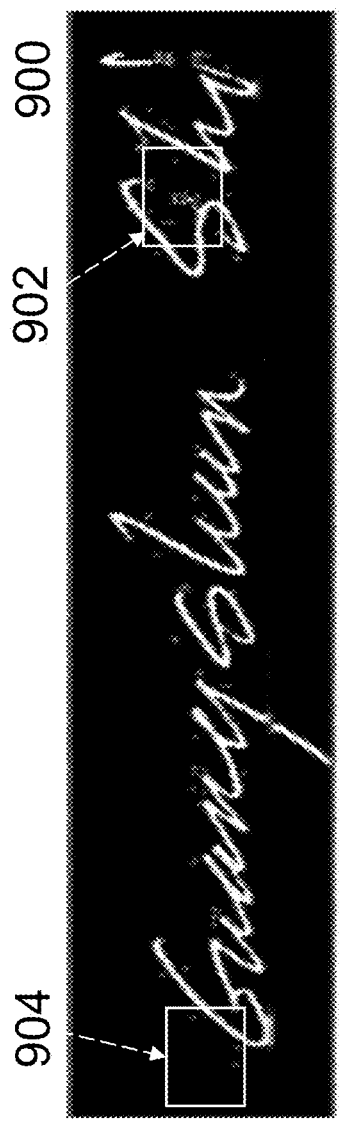
FIG. 9 illustrates a text box image segment with extra strokes removed, according to an embodiment.

FIG. 9 illustrates an example text box image segment with extra strokes removed. As described above, the system server can remove the noise from the segment to be analyzed. The system server can aggregate all the pixels in remaining strokes. If the total pixels are fewer than 30, it is likely a black dot on the check (e.g., the system detects these pixels as dots). The system server can also remove the detected dots to improve the image recognition process. As depicted, various optical recognition protocols may generate noise pixels (e.g., noise 902 and 904). In some embodiments, the handwritten content may include noise as well.

Figure 10:
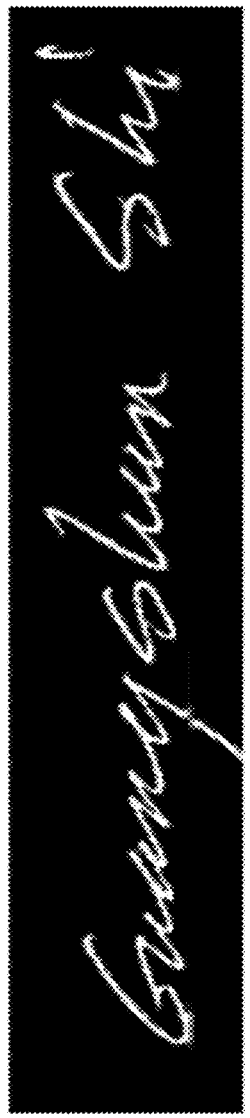
FIG. 10 illustrates a text box image segment with detected dots removed, according to an embodiment.

FIG. 10 illustrates an example text box image segment with detected dots removed. The system server (e.g., correction 126 tool) can correct an image segment by implementing different de-slanting processes. The system server can de-slant the handwritten image in order to reduce handwritten styles. The system server (e.g., the correction 126 tool) shifts the image with different radians ranging from [−1, 1], and selects the shifted image with the most number of connected vertical line segments as the output. The depicted embodiment, the segment 1000 represents de-noising of the outer box 900 (FIG. 9).

Figure 11:
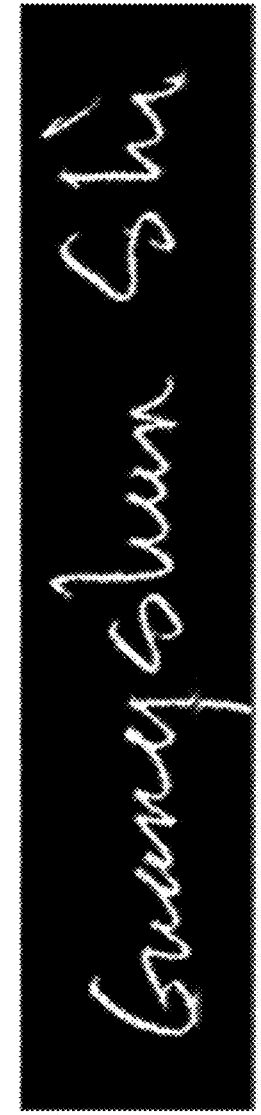
FIG. 11 illustrates a text box image segment that has been de-slanted, according to an embodiment.

FIG. 11 illustrates an example text box image segment that has been de-slanted. The system server (e.g., correction 126 tool) can also correct an image segment by cutting the segment into separate word segments. A word-level handwritten recognition model can improve the accuracy rate. The system server can separate the image segments into separate word image segments. To do so, the system server can calculate the gap between each stroke and split the image based on the calculated gap. The segment 1100 represents de-slanted content represented in the segment 1000 (FIG. 10).

Figure 12:
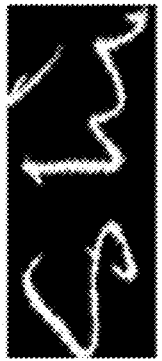
FIG. 12 illustrates a text box image segments with separate (individual) words, according to an embodiment.
Figure 12:
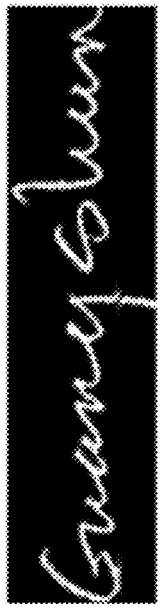

FIG. 12 illustrates example text box image segments with separate (individual) words. These two image segments are sent to the handwritten text recognition model (e.g., model 128 in FIG. 1) for continued processing. The system server uses text recognition protocols to extract data from the image segments. Before providing the image segments to text recognition model, the system server can normalize the image segment(s). For instance, the system server can resize and pad the word image to a 64×256 image. As depicted, the system server generates segments 1201 and 1202 using the segment 1100 (FIG. 11).

The system server can execute an AI/ML model (e.g., CNN) to extract data from each segment. For instance, Table 1 illustrates a layout of a CNN for extracting data from each segment (e.g., segment 1201 and/or 1202).

TABLE 1

| Step | Configurations |
|---|---|
| Input | 64 × 256 × 1 normalized matrix |
| 2D Convolutional Layer 1 | Filter = 32 Kernel = 3, Stride = 1, padding = SAME, Activation = relu |
| Batch normalization | Momentum = 0.99, epsilon = 0.001 |
| Drop out | drop rate = 0.2 |
| Max pooling | Pooling size = (2, 2) stride = (2, 2) |
| 2D Convolutional Layer 2 | Filter = 32 Kernel = 3, Stride = 1, padding = SAME, Activation = relu |
| Batch normalization | Momentum = 0.99, epsilon = 0.001 |
| Drop out | drop rate = 0.2 |
| Max pooling | Pooling size = (2, 2) stride = (2, 2) |
| 2D Convolutional Layer 3 | Filter = 64 Kernel = 3, Stride = 1, padding = SAME, Activation = relu |

TABLE 1-continued

| Step | Configurations |
|---|---|
| Batch normalization | Momentum = 0.99, epsilon = 0.001 |
| Drop out | drop rate = 0.2 |
| Max pooling | Pooling size = (2, 2) stride = (2, 2) |
| 2D Convolutional Layer 4 | Filter = 128 Kernel = 3, Stride = 1, padding = SAME, Activation = relu |
| Batch normalization | Momentum = 0.99, epsilon = 0.001 |
| Drop out | drop rate = 0.2 |
| Max pooling | Pooling size = (1, 2) stride = (1, 2) |
| 2D Convolutional Layer 5 | Filter = 256 Kernel = 3, Stride = 1, padding = SAME, Activation = relu |
| Batch normalization | Momentum = 0.99, epsilon = 0.001 |
| Drop out | drop rate = 0.2 |
| Max pooling | Pooling size = (1, 2) stride = (1, 2) |
| 2D Convolutional Layer 6 | Filter = 256 Kernel = 3, Stride = 1, padding = SAME, Activation = relu |
| Batch normalization | Momentum = 0.99, epsilon = 0.001 |
| Drop out | drop rate = 0.2 |
| Max pooling | Pooling size = (1, 2) stride = (1, 2) |
| CNN layer's output | 1 × 32 × 256. Generates 32 vectors, each vector has 256 dimension. |

In some embodiments, the system server may execute a CNN network, which may result in identifying various vectors that correspond to various attributes of each segment. For instance, the CNN can analyze and output 32 vectors for each segment. The system server can analyze a 64×64 window that slides from the input image (64×256) with stride of four. The system server may then extract 256 features from each segment, for example.

The number of vectors may correspond to a predetermined number of attributes identified by the system server. In the above-described example, the handwritten words may comprise fewer than 32 characters. Hence, the system server may customize the model to extract only 32 vectors. In some embodiments, this number can be revised by a user/administrator.

In some embodiments, the system server (using a module, such as the text recognition 128) may utilize a long short-term memory (LSTM) layer to identify various characters/letters based on other character/letters. If the system server cannot definitively determine/identify a character, the system server can identify the unknown character using the preceding or the subsequent letters or characters. Using a variety of rules-based approaches, the system server can identify an unknown character using the letters/characters that appear before or after the unknown character.

In a non-limiting example, the system server may use an LSTM model to identify the letters within an image that corresponds to a hand-written word "magic." The system server may determine that it cannot identify 'a' in "magic." Specifically, the system server may determine than the second letter in the word "magic" may be 'a,' 'e,' or 'o.' Therefore, the system server may determine the second letter using the preceding and/or the subsequent letters (i.e., 'm' and 'g'). The system server can add LSTM layers to mimic these efforts. Table 2 provides an example LSTM layout and configurations:

TABLE 2

| Step | Configurations |
|---|---|
| Input | 1 × 32 × 256 matrix |
| Bidirectional-LSTM | 256 hidden units |
| Bidirectional-LSTM | 256 hidden units |
| Concatenate | Forward and backward of bidirectional LSTM, each vector 512 |
| Dense layer | Compress each vector from 512 to 66 |
| Output logits | 32 × 66, consider 66 characters include A-Z, a-z, 0-9, whitespace, $, etc. |

Additionally or alternatively, the system server may use a loss function and decoder. In some embodiments, the system server uses class connectionist temporal classification (CTC) loss function as the model's objective. With regard to the decoder, the system server may create a language powered CTC decoder to reach better accuracy.

Example output of CTC model can be a 32×66 matrix with the probabilities in each cell, as illustrated in table 3.

TABLE 3

| | Position1 | Position2 | Position3 | ... | Position30 | Position31 | Position32 |
|---|---|---|---|---|---|---|---|
| 'a' | $P_{1,1}$ | $P_{2,1}$ | $P_{3,1}$ | | $P_{30,1}$ | $P_{31,1}$ | $P_{32,1}$ |
| 'b' | $P_{1,2}$ | | | | | | |
| 'c' | | | | | | | |
| ... | ... | | | | | | |
| '9' | $P_{1,65}$ | | | | | | |
| '0' | $P_{1,66}$ | | | | | | |
| Sum | 100% | 100% | 100% | ... | 100% | 100% | 100% |

Each column may correspond to the softmax of logits at position t. The probabilities of P (i,j) may represent the probability of $i^{th}$ character at $j^{th}$ position. This probability matrix can be combined with the language model utilized by the system server (e.g., language model 132) to enhance beam search and to translate the data to string.

The system server (utilizing a module, such as the text recognition 128) may use the language model(s) 132 to extract data from the image segments. For text recognition, a language model (LM) can be built from a large corpus, added into the recognition to fine-tune the results. The LM may logically follow the language spelling rules.

Because various word (e.g., non-ubiquitous names) do not follow specific spelling rules, recognition of their characters (using only image recognition techniques) may result in inaccurate predictions. To rectify this problem, the system server may extract spelling of different names and generate the LM accordingly. For instance, the system server may retrieve a list of customer names from the database (e.g., a customer name database from an internal company database or third-party database). The system server may then generate the LM accordingly.

The system server (utilizing a module, such as the text recognition 128) may apply an adaptive learning rate optimization algorithm (e.g., an Adam Optimizer) as gradient descent optimizer to improve text recognition results and train the model. For instance, the initial learning rate of the model may be 0.001. However, as the system server trains the model accordingly, the learning rate may follow exponential decay (the decay steps=1000 and decay rate=0.94).

Referring back to FIG. 3, at step 306, when the system server is unable to execute the image recognition protocol, the server executes a nodal data structure to identify the second letter based upon the identified first letter, the nodal data structure comprising a set of nodes where each node represent a letter, each node within the set of nodes connected to at least one other node within the set of nodes wherein connection of a first node to a second node corresponds to a probability that a letter corresponding to the second node is used in the word subsequent to a letter corresponding to the first node.

As described above, the system server may execute one or more of the image recognition protocols described herein to identify content of an image. However, for the reasons described in the background, some of the image processing and recognition protocols may not produce accurate results. For instance, the system server, using the image recognition protocols described above, may be unable to identify one or more portions of the image. In a non-limiting example, the system server may not identify (with a high degree of certainty) one or more letters within a handwritten name.

In order to rectify this shortcoming, the system server may generate a language model (sometimes referred to as a name language model). The language model may be an artificial intelligence model (e.g., deep neural network) having a set of nodes where each node represents a letter. During training of the language model, the system server may train the language model using a variety of existing names using a large corpus. When trained, the set of nodes are interconnected based on a probability of various letters occurring subsequent to others. When executed, the language model may receive one or more identified letters within an image and predicts one or more subsequent letters with their respective probability of occurrence.

Figure 13:
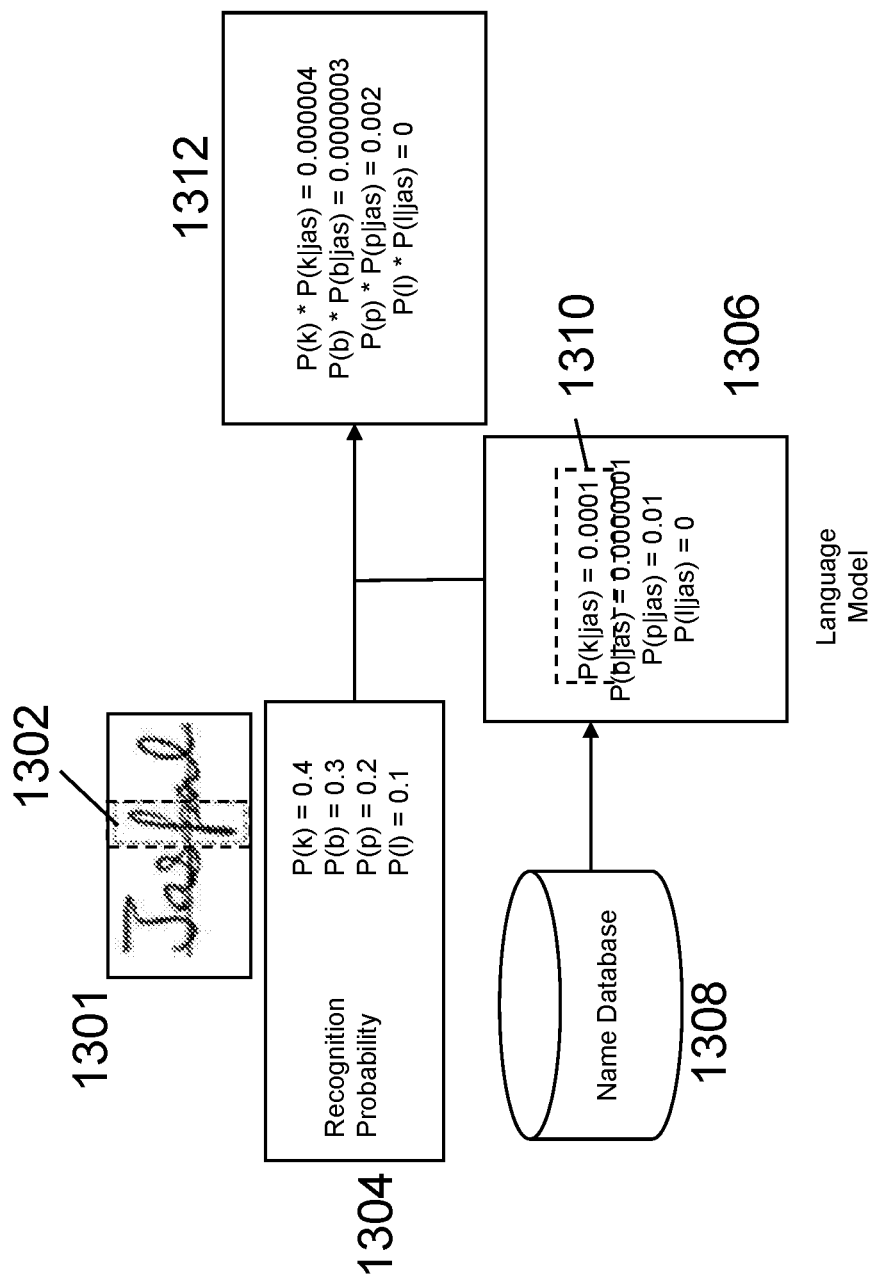
FIG. 13 is a schematic diagram of a language model, according to an embodiment.

FIG. 13 is a schematic diagram of a language model with the ability to correct prediction probability. In the depicted embodiment, the system server uses various image recognition protocols to identify the content of the handwritten image 1301. The system server may use the language model to identify the letter 1302. Therefore, the system server uses the image recognition protocols described herein in conjunction with the language model to produce accurate results. He To build the name language model, the system server my first retrieve various names from the name database 1308. The system server can then calculate the conditional probabilities for each letter based on the following example:

$$P(t_n | t_0 t_1 \ldots t_{n-1}) = \frac{\text{Count}(t_0 t_1 \ldots t_n)}{\text{Count}(t_0 t_1 \ldots t_{n-1})}$$

For example:

$$P(p | jas) = \frac{\text{Count}(jasp)}{\text{Count}(jas)}$$

The data storage capacity required to save this information may grow exponentially with the length of character sequence. A prefix tree can be used to store the probability and character sequence structure information. The edges between the nodes may store the probabilities.

In the depicted embodiment, the system server receives the handwritten image 1301, which illustrates the word "Jaspal," a common Indian name. Because "Jaspal" is a non-ubiquitously used name, a handwritten image of "Jaspal" may not be accurately and efficiently predicted using conventional image recognition protocols (including artificial intelligence modeling techniques).

Initially, the system server may execute various image recognition, AI, and/or ML protocols to identify the handwritten image 1301. As a result, the system server may identify the first letter as 'j,' the second letter as 'a,' and the third letter as 's.' However, the system server may not identify the letter 1302 for the aforementioned reasons. The system server, using image recognition methods and systems described above, may generate a recognition probability/confidence table 1304 identifying four candidate letters that could correspond to the letter 1302. For instance, the table 1304 illustrates that the system server identifies 'k,' 'b,' 'p,' and 'i' as possible matches to the letter 1302. Furthermore, as depicted in the table 1304, the system server may determine a probability/confidence value for each candidate matching the letter 1302. For instance, the system server may attribute a 40% confidence that the letter 1302 corresponds to 'k.'

The system server then executes the language model 1306 to further refine the possible choices identified within the table 1304. As described above, the system server may generate and train the language model 1306 using names received from a name database 1308.

The language model 1306 may analyze various ground truth names within the name database 1308 and may generate a probability for each letter based on its preceding letters. For instance, the language model 1306 may identify a confidence value of 0.0001 for the letter 'k' being used after letters 'j,' 'a,' and 's,' as depicted in confidence value 1310. Similarly, the language model 1306 identifies no chance that the letter 'i' is used after letters 'j,' 'a,' and 's.'

The system server may combine the confidence values of the table 1304 and the confidence values calculated using the language model 1306, as depicted in table 1312. After combining (e.g., multiplying) the confidence factors, the system server may select the candidate with the highest combined confidence value. For instance while letter 'i' corresponds to a 0% confidence, 'p' corresponds to the highest combined confidence value among other candidates. Therefore, the system server identifies the letter 1302 as 'p.'

Figure 14:
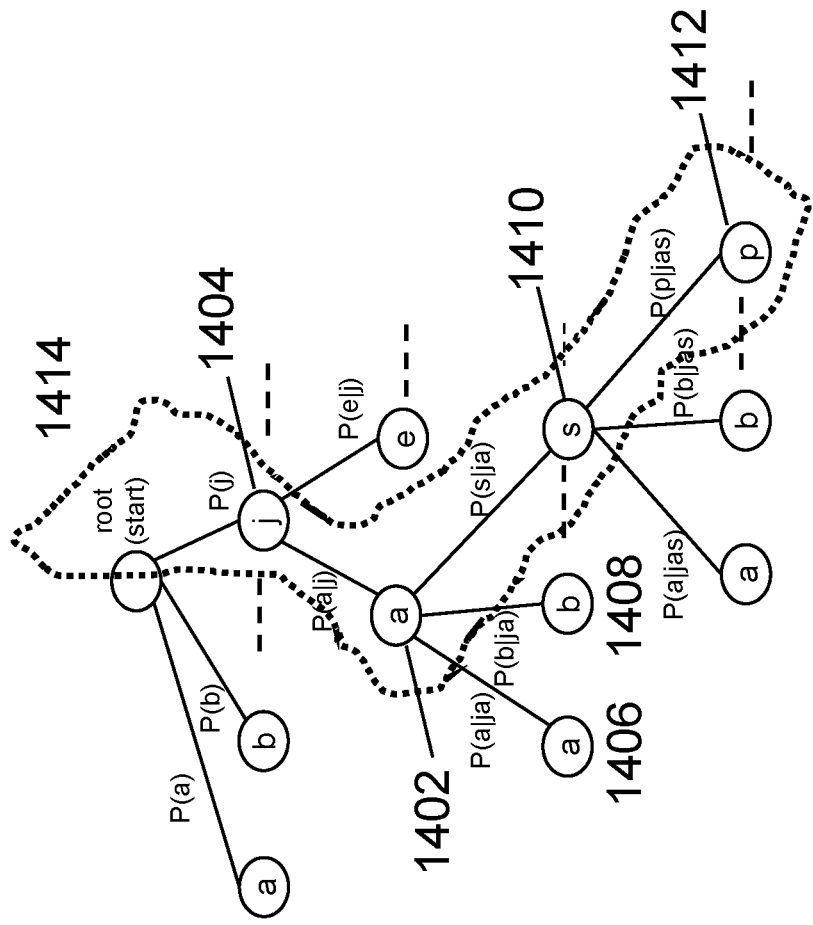
FIG. 14 shows a visual representation of a nodal data structure (e.g., a prefix tree), according to an embodiment.

FIG. 14 a visual representation of the nodes within the language model is depicted, in accordance with an embodiment. As depicted, nodal data structure 1400 includes various connected nodes where each node represents a letter/character. Each node is also connected to a previous and subsequent node using edge technology. For instance node 1402 corresponds to letter 'a' that appears subsequent to letter 'j' (node 1404). Each node connected to the node 1402 (e.g., nodes 1406, 1408, and 1410) may represent letters identified, by the language model, that could possibly follow letters 'j' and 'a.' Each node may also contain data corresponding to a confidence/probability value of the letter occurring subsequent to the previous node. For instance, node 1408 may include the probability (i.e., P(b|ja)), which corresponds to a probability of the 'b' being used after letters 'j' and 'a.'

The nodal data structure 1400 may also correspond to the handwritten image 1301, depicted in FIG. 13. The system server may identify letters "jas" that correspond to nodes 1404, 1402, and 1410 respectively. After identifying that the third letter corresponds to 's' (node 1410), the system server may identify the next letter as 'p' based on the nodal data structure 1400 using the node with the highest probability/confidence value (node 1412). Therefore, the path 1414 represents a sequence of the strings that identify "jasp." As illustrated herein, the system server may traverse the nodal data structure 1400 in multitude of directions to identify a next possible letter used in a name.

In some embodiments, the system server may store the nodal data structure in a local and/or remote data repository. However, storing a full nodal data structure (e.g., prefix tree) that corresponds to millions of names may require storage and memory capabilities that may lead to inefficiencies. Therefore, the system server may generate a simplified language model in some embodiments.

To simplify the nodal data structure, the system server can limit the nodal data structure to a predetermined number of layers or depth (e.g., layers of nodes). The depth or the number of layers refer to the number of consecutive nodes. The system server may only generate a nodal data structure that includes a limited number of connected nodes. For instance, the depicted nodal data structure 1400 has a depth of four (i.e., j-a-s-p).

For sequences that are longer than the predefined depth limit or unseen sequence, the system server may use character-level tri-gram probability model. A character-level tri-gram probability model smooths the full conditional probability as follows:

$P(t_n|t_0 t_1 \ldots t_{n-1}) \approx P(t_n|t_{n-2} t_{n-1})$, where n>6 (or any other predetermined number of layers)

Where N represents the predetermined number of layers. For an unseen tri-gram (out of vocabulary sequence that does not exist in the n-gram database), a smoothing method is used. The following is a no-limiting smoothing algorithm:

$P(t_n|t_{n-2} t_{n-1}) = 0.4 * P(t_n|t_{n-1})$

The same rule applies to unseen bi-grams:

$P(t_n|t_{n-1}) = 0.4 * P(t_{n-1})$

In some embodiments, even storing these n-gram probabilities can still be storage and/or memory intensive. In some embodiments, the system server may only use a predefined number of n-grams (e.g., the top 1000000 n-grams). Therefore, the system server can use the image recognition protocols described herein in conjunction with the language model and/or the trigram probability model. Using this method, the system server may execute and image processing protocols without sacrificing computing/storage resources or accuracy.

Even though the language model in FIG. 13 is described in the context of a name language model, it is expressly understood that the language model can be specific to any category. For instance, a language model may correspond to different addresses (e.g., names of different streets and names of different cities).

Figure 15:
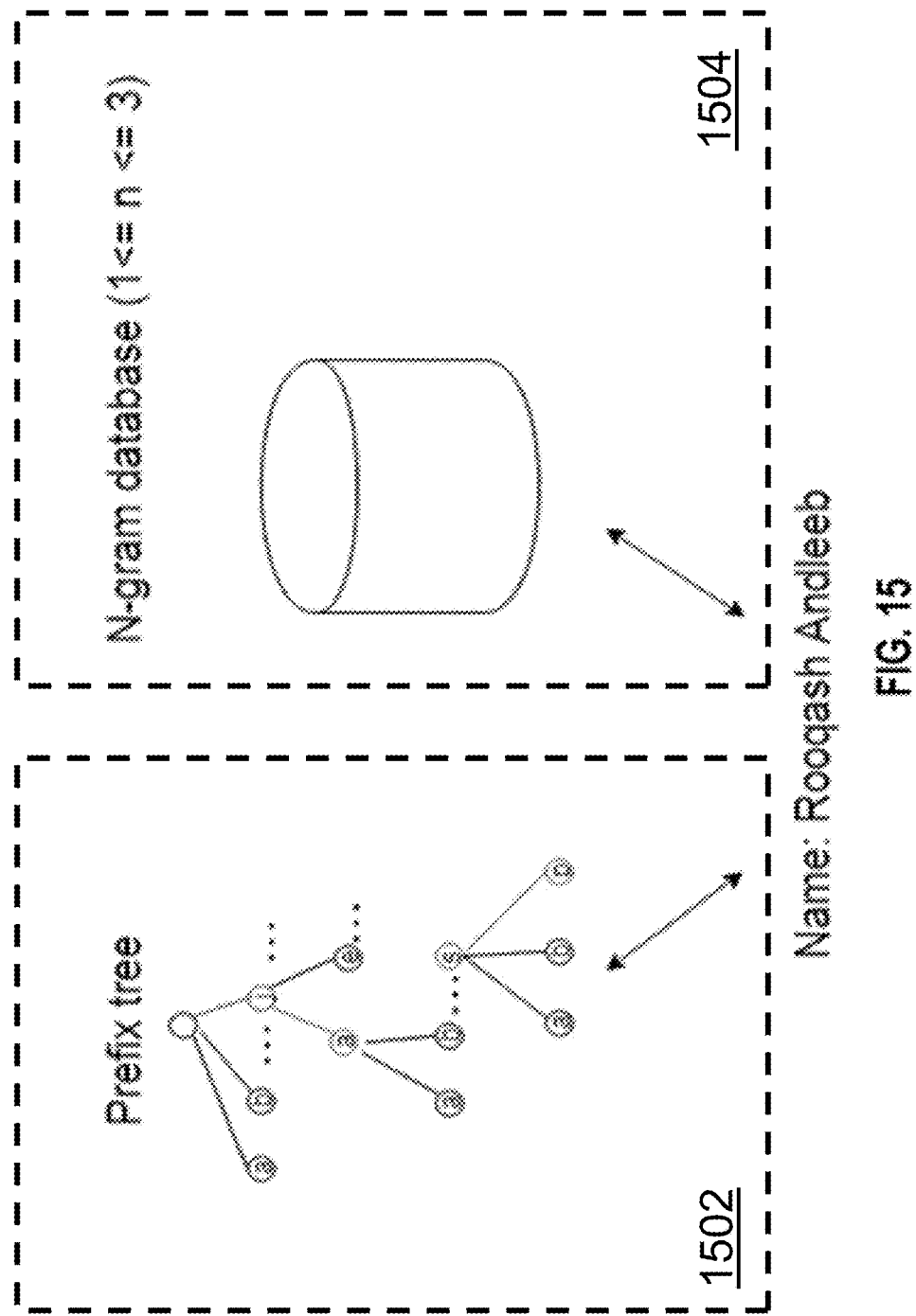
FIG. 15 shows a language model mechanism for storing language model with a nodal prefix tree and n-gram database, to balance common and rare sequences, according to an embodiment.

FIG. 15 shows a visual representation of a language model mechanism for storing language model with prefix tree and n-gram database, to balance common and rare sequences. FIG. 15 shows an example in which the system server receives a request to identify a handwritten image of "Rooqash Andleeb." The system server may use the above-described methods and systems to identify "Rooqash." However, in this embodiment, the system server utilizes a language model that has a nodal data structure that is limited to a depth of six nodes. That is, in order to improve memory and storage capabilities utilized, the system server may use a nodal data structure that is limited to the first six letters. Therefore, the system server can only identify the first six letters (e.g., "Rooqas").

To calculate the last letter, the system server may utilize a secondary model. For instance, the probability of sequence of each letter within 'Rooqas' can be calculated directly from the prefix tree 1502, but no conditional probability for P(h|Rooqas) can be found on the prefix tree 1502. Therefore, the system server queries the n-gram model 1504 and searches for P (h|as). In some embodiments, the probabilities predicted by the CRNN model are then combined with the conditional probabilities generated by the language model when searching probable text sequences. In some embodiments, the N-gram database can be implemented with a local Elastic search database for improved performance.

Dated, the n-gram database or the n-gram model may also be limited to a predetermined number of layers (e.g., n-grams). Instance, the n-gram model 1504 is limited to n-gram queries between one and three letters.

Upon identifying the full word (e.g., Rooqash), the system server may transmit the results to a computing device. For instance, the system server may transmit the identified word to a second server and/or display the results on a computing device.

The system server may use the results to re-train any of the AI/ML, models accordingly. For instance, the system server may monitor how one or more users (e.g., a user operating the computing device) interact with the predicted results. The system server may then use the interactions data to train the models accordingly. In a non-limiting example, when the predicted results are ignored by a user, the system server may user various back-propagation techniques to train the AI model accordingly.

Additionally or alternatively, the system server may display a prompt requesting the users to provide feedback regarding the predicted results outputted by the system server. For instance, the system server may display a prompt having an input element (e.g., text string input, drop down menu, radio button). The end user may interact with the prompt to input a feedback regarding the accuracy of the results outputted by the system server. When the users indicate the results as unsatisfactory, the system server may revise one or more AI/ML models accordingly.

In a non-limiting example, the system server may display "Rooqash" on a computing device operated by an end user. The system server may then monitor whether the end user accepts or denies the predicted results. When the end user denies the predicted results, the system server will revise/train one or more AI/ML models accordingly.

Figure 16:
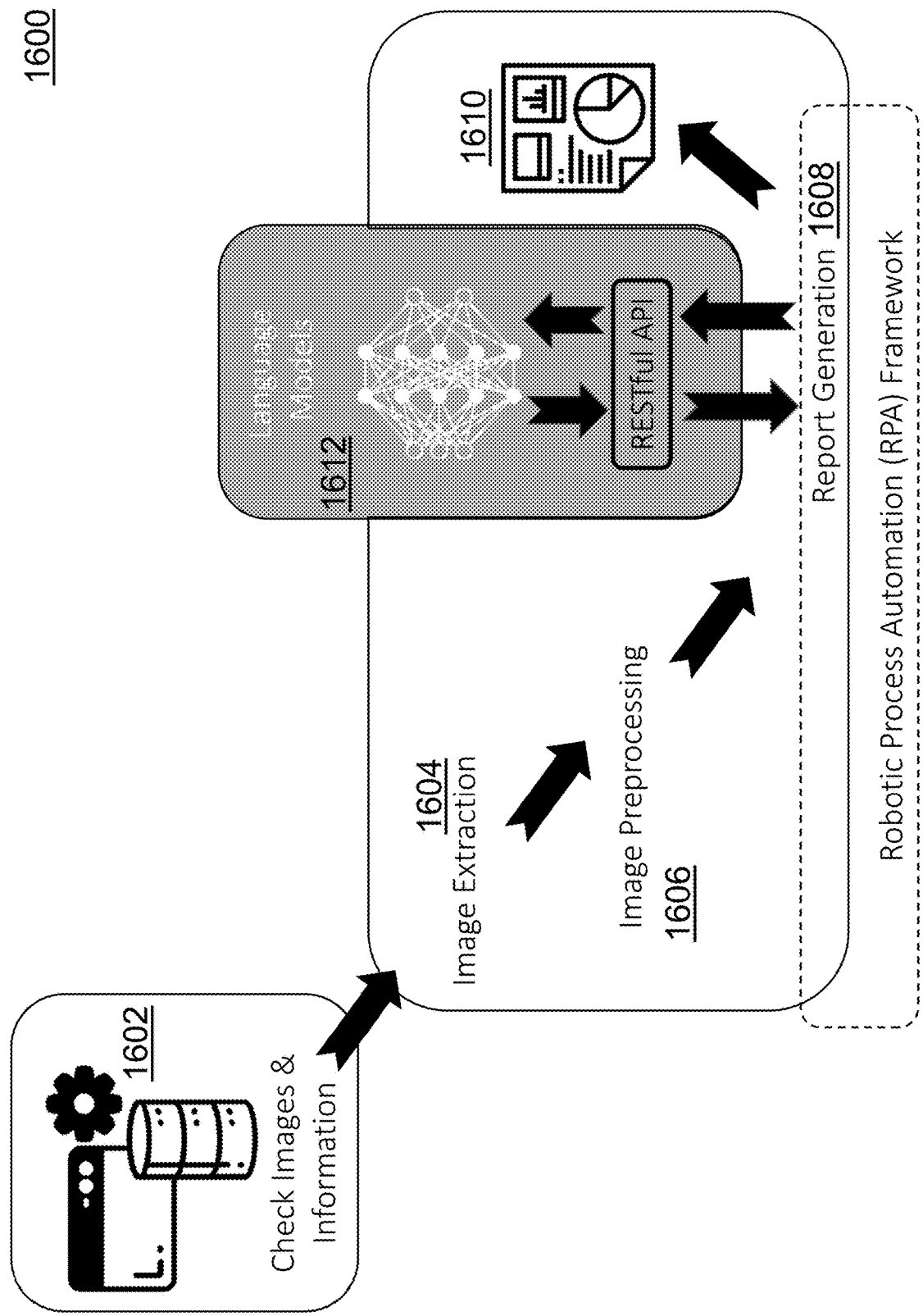
FIG. 16 shows a non-limiting example of how a system server uses the methods and systems described herein to identify content of an image, according to an embodiment.

FIG. 16 shows a non-limiting example of how a system server uses the methods and systems described herein to identify content of an image, in accordance with an embodiment. In this non-limiting example 1600, a system server analyzes an image of a check having a handwritten name "Mazyar."

At 1602, the system server receives an image of a check. The check includes a handwritten name of a customer (Mazyar). At 1604, the system server may extract the handwritten portion using image extraction protocols described above (e.g., FIG. 4). At 1606, the system server may preprocess the extracted image using the preprocessing protocols described above (e.g., FIGS. 5-12). At 1608, the system processor may execute various image recognition protocols to identify the content of the extracted and preprocessed image. Using the image recognition protocols, the system server identifies the first three letters ("maz"). However, because Mazyar is a rare and non-ubiquitous name, conventional image recognition protocols may not accurately identify the fourth letter ("y").

As a result, the system server uses an application-programming interface to execute a language model and to identify the fourth letter. The language model utilizes a neural network (a set of interconnected nodes) trained based on a names database (e.g., large corpus of names). The system server may execute the language model by inputting the first three identified letters ("maz") and requesting the language model to predict the subsequent letter. Traversing the nodal data structure, the language model may identify the subsequent letter as "y." The system server may similarly identify the following two letters.

In some embodiments, the system server may be a part of a computer environment, such as the robotic process automation framework, that automatically scans various documents, analyzes their written content, and generated automatic reports.

When the system server identifies all the letters, the system server may display "Mazyar" on the report 1610. The report may be displayed directly on a user device (e.g., administrator's computing device or the customer's computing device). The system server may then determine if the system server identified the handwritten letter correctly by monitoring the user's actions and train one or more AWL models described herein accordingly.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
    extracting, by a server, a first image portion from a first image, the first image portion comprising a word to be identified, the server using an optical character recognition protocol and predefined coordinates of the first image to extract the first image portion, the word comprising at least a first letter and a second letter;
    executing, by the server, an image recognition protocol to identify the first letter; and
    when the server is unable to identify the second letter using the image recognition protocol, executing, by the server, a neural network comprising a nodal data structure to identify the second letter based upon the identified first letter,
        the nodal data structure comprising a set of nodes where each node represents a letter, each node within the set of nodes connected to at least one other node within the set of nodes, wherein connection of a first node to a second node corresponds to a probability that a letter corresponding to the second node is used in the word subsequent to a letter corresponding to the first node.

2. The method of claim 1, wherein the image recognition protocol comprises:
    executing, by the server, an artificial intelligence model that generates one or more vectors corresponding to one or more attributes of the first image portion.

3. The method of claim 1, wherein the neural network is limited to a predetermined depth.

4. The method of claim 3, wherein when the word comprises more letters than the predetermined depth of the neural network, the server queries an n-gram database to retrieve a probability of a next letter.

5. The method of claim 1, wherein the first image is an image of a check.

6. The method of claim 5, wherein the first image portion is an image of a name written within a designated area within the check.

7. The method of claim 1, further comprising:
    removing, by the server, visual noise from the first image portion.

8. The method of claim 7, wherein the visual noise is a line that is not part of the word.

9. The method of claim 1, wherein the server de-slants the first image portion.

10. The method of claim 1, further comprising:
    transmitting, by the server, the identified first and the second letter to a computing device; and
    training, by the server, the neural network when the computing device indicates that at least one of the first or the second letter is incorrect.

11. A system comprising:
    a computing device configured to transmit a first image to a server along with a request for the server to identify content of a first image portion within the first image; and
    the server in communication with the computing device, the server configured to:
        extract the first image portion from the first image, the first image portion comprising a word to be identified, the server using an optical character recognition protocol and predefined coordinates of the first image to extract the first image portion, the word comprising at least a first letter and a second letter;
        execute an image recognition protocol to identify the first letter; and
        when the server is unable to identify the second letter using the image recognition protocol, execute a neural network comprising a nodal data structure to identify the second letter based upon the identified first letter,
            the nodal data structure comprising a set of nodes where each node represents a letter, each node within the set of nodes connected to at least one other node within the set of nodes, wherein connection of a first node to a second node corresponds to a probability that a letter corresponding to the second node is used in the word subsequent to a letter corresponding to the first node.

12. The system of claim 11, wherein the image recognition protocol comprises executing an artificial intelligence model that generates one or more vectors corresponding to one or more attributes of the first image portion.

13. The system of claim 11, wherein the neural network is limited to a predetermined depth.

14. The system of claim 13, wherein when the word comprises more letters than the predetermined depth of the neural network, the server queries an n-gram database to retrieve a probability of a next letter.

15. The system of claim 11, wherein the first image is an image of a check.

16. The system of claim 15, wherein the first image portion is an image of a name written within a designated area within the check.

17. The system of claim 11, wherein the server is further configured to:
    remove visual noise from the first image portion.

18. The system of claim 17, wherein the visual noise is a line that is not part of the word.

19. The system of claim 11, wherein the server de-slants the first image portion.

20. The system of claim 11, wherein the server is further configured to:
    transmit the identified first and the second letter to a computing device; and
    train the neural network when the computing device indicates that at least one of the first or the second letter is incorrect.

* * * * *